US009707534B2

(12) United States Patent
Bai et al.

(10) Patent No.: US 9,707,534 B2
(45) Date of Patent: Jul. 18, 2017

(54) ANTIBUBBLE GENERATOR AND PREPARATION METHOD

(71) Applicant: INSTITUTE OF ACOUSTICS, CHINESE ACADEMY OF SCIENCES, Beijing (CN)

(72) Inventors: Lixin Bai, Beijing (CN); Jingjun Deng, Beijing (CN); Chao Li, Beijing (CN); Delong Xu, Beijing (CN); Weijun Lin, Beijing (CN)

(73) Assignee: Institute of Acoustics, Chinese Academy of Sciences, Beijing (CN)

( * ) Notice: Subject to any disclaimer, the term of this patent is extended or adjusted under 35 U.S.C. 154(b) by 83 days.

(21) Appl. No.: 14/594,538

(22) Filed: Jan. 12, 2015

(65) Prior Publication Data

US 2016/0016139 A1    Jan. 21, 2016

(30) Foreign Application Priority Data

Jul. 18, 2014    (CN) .......................... 2014 1 0342506

(51) Int. Cl.
*B01J 13/04* (2006.01)
*B01F 3/04* (2006.01)
*B01F 3/08* (2006.01)

(52) U.S. Cl.
CPC .......... *B01J 13/04* (2013.01); *B01F 3/04446* (2013.01); *B01F 3/04758* (2013.01); *B01F 3/0876* (2013.01)

(58) Field of Classification Search
CPC ............................. F17D 1/00; Y10T 137/0391
See application file for complete search history.

(56) References Cited

U.S. PATENT DOCUMENTS

| | | | | |
|---|---|---|---|---|
| 4,140,609 A | * | 2/1979 | Zucker | B01D 43/00 204/553 |
| 4,177,808 A | * | 12/1979 | Malbec | A61M 5/36 137/171 |
| 6,416,740 B1 | * | 7/2002 | Unger | A61K 9/127 424/450 |
| 2003/0188786 A1 | * | 10/2003 | Toki | B01D 35/0273 137/565.34 |
| 2013/0327409 A1 | * | 12/2013 | Silpe | F17D 1/00 137/13 |
| 2015/0202151 A1 | * | 7/2015 | Poortinga | A23L 1/0029 424/452 |
| 2016/0000886 A1 | * | 1/2016 | Parker | A61K 9/1273 424/491 |
| 2016/0016139 A1 | * | 1/2016 | Bai | B01J 13/04 516/10 |

\* cited by examiner

*Primary Examiner* — Michael A Salvitti
(74) *Attorney, Agent, or Firm* — Buchanan Ingersoll & Rooney PC (57) ABSTRACT

The present invention relates to an antibubble generator and a preparation method. The antibubble preparation method includes: generating a jet flow or droplets in a discrete phase from a first fluid through a gas phase; and under the action of an external force, the jet flow or droplets passing through a liquid membrane and moving towards a second fluid in a continuous phase, to form antibubbles. The present invention can generate a large number of antibubbles in a simple and convenient way, and can meet the needs of large-scale industrial applications.

19 Claims, 6 Drawing Sheets

ANTIBUBBLE GENERATOR AND PREPARATION METHOD

BACKGROUND

Technical Field

The present invention relates to the field of bubble preparation, and specifically to an antibubble generator and an antibubble preparation method.

Related Art

Soap bubbles are present in a spherical shell formed by a thin liquid membrane in a gas, and the gas is inside and outside the bubbles. However, many people do not know that there are antibubbles similar thereto, which have an opposite structure. The antibubbles are present in a spherical shell formed by a thin gas membrane in a fluid, and the fluid is inside and outside the bubbles. Although there have been reports about antibubbles as early as in 1932 and the antibubbles were officially named in 1974, the field of antibubbles is still the one that we know very little about and remains to be broken through.

The antibubbles have many potential applications, for example, an air network formed by the antibubble foam can filter the air, the antibubble foam has a large gas-liquid surface area which can be used in chemical cleaning, a specific liquid can be contained inside the antibubbles for mass transportation and the like. However, practical applications of the antibubbles are rare, and one of the main reasons is that generation of the antibubbles is difficult, generation conditions are harsh, and the yield is very low.

There is only one currently known method to produce antibubbles, that is, impacting a liquid surface by using droplets or a liquid jet flow, to form a gas membrane between the droplets or liquid jet flow and the liquid surface, the droplets or liquid jet flow compressing the liquid surface under the action of gravity to go into a fluid, and then the gas membrane being closed and becoming spherical due to surface tension, to form antibubbles. However, this method for generating antibubbles has high requirements for surface cleanliness, the survival rate of the antibubbles is low, and the yield is very small. Therefore, a new antibubble generation technique is needed, so as to easily generate a large number of antibubbles and meet the needs of large-scale industrial applications.

SUMMARY

The objective of the present invention is to provide a foam-type antibubble generator, which can generate a large number of antibubbles in a simple and convenient way and can meet the needs of large-scale industrial applications.

In order to achieve the above objective, in a first aspect, the present invention provides an antibubble preparation method, which includes: generating a jet flow or droplets in a discrete phase from a first fluid through a gas phase; and under the action of an external force, the jet flow or droplets passing through a liquid membrane and moving towards a second fluid in a continuous phase, to form antibubbles.

In the first aspect, preferably, the external force is one of an inertia force and an electromagnetic force, or a composite thereof.

Preferably, the liquid membrane is a liquid membrane of a foam layer. More preferably, the foam layer is generated by an airflow method, an agitation method or a dissolved gas method.

Preferably, the droplets are formed through scattering relying on the Rayleigh-Plateau instability by a jet flow method.

Preferably, the droplets are generated relying on a drip method, a condensation method or a vibration method.

In a second aspect, the present invention provides an antibubble generator. The antibubble generator includes: a jet flow or droplet generating system, for generating a jet flow or droplets in a discrete phase from a first fluid through a gas phase; a container, for containing a second fluid in a continuous phase; and a liquid membrane generating device, for forming a liquid membrane on the second fluid; where, under the action of an external force, the jet flow or droplets pass through the liquid membrane and move towards the second fluid, to form antibubbles.

Preferably, a jet flow or droplet generating system includes a first nozzle, for forming a fluid jet flow in the gas phase, so as to generate the droplets.

Preferably, the jet flow or droplet generating system includes a drip nozzle, a condenser or a vibrator, for generating the droplets.

Preferably, the liquid membrane is a liquid membrane of a foam layer. More preferably, the antibubble generator includes a second nozzle, for forming bubbles in the second fluid, so as to form a foam layer floating on a gas-liquid interface. The jet flow or droplet generating system may also include a positioning tube, the positioning tube pointing to an intersection area between bubbles of the foam layer; where the fluid jet flow passes through the positioning tube, and then passes through the intersection area between bubbles of the foam layer.

Preferably, the liquid membrane generating device includes a liquid membrane frame, where one part of the liquid membrane frame is immersed in the second fluid, and one part is in the gas phase.

Preferably, the external force is a force of gravity.

Preferably, the droplet generating system includes an inner rotor, where the inner rotor accommodates the first fluid in the discrete phase; the liquid membrane generating device includes an outer rotor, where the outer rotor accommodates the second fluid in the continuous phase; and the external force is a centrifugal force, where the outer rotor forms a cylindrical liquid surface of the second fluid inside a barrel under the action of the centrifugal force. More preferably, the liquid membrane generating device includes a bubble generator, where bubbles generated by the bubble generator float on the cylindrical liquid surface to form a liquid membrane; and under the action of the centrifugal force, the first fluid in the discrete phase flows out from the nozzle to form a jet flow, which shoots to the bubbles in a radial form and goes into the second fluid in the continuous phase by means of the liquid membrane to form antibubbles. Rotation speeds of the outer rate and the inner rotor may be different.

Preferably, the external force is a magnetic force. The droplet generating system adds magnetic particles to the first fluid in the discrete phase, and under the action of the external magnetic force, the droplets moves towards the second fluid in the continuous phase, to form magnetic antibubbles.

The present invention can generate a large number of antibubbles in a simple and convenient way, and can meet the needs of large-scale industrial applications.

BRIEF DESCRIPTION OF THE DRAWINGS

The disclosure will become more fully understood from the detailed description given herein below for illustration only, and thus are not limitative of the disclosure, and wherein:

FIG. 9(A) to FIG. 9(H) and FIG. 10 respectively illustrate snapshots of a formation process of antibubbles;

DETAILED DESCRIPTION

In the following, the present invention is clearly and completely described in detail with reference to the accompanying drawings and specific embodiments, and in the accompany drawings, it is obvious that the embodiments to be described are only a part rather than all of the embodiments of the present invention. All other embodiments derived by persons of ordinary skill in the art based on the embodiments of the present invention without carrying out creative activities should fall within the protection scope of the present invention.

Figure 1:
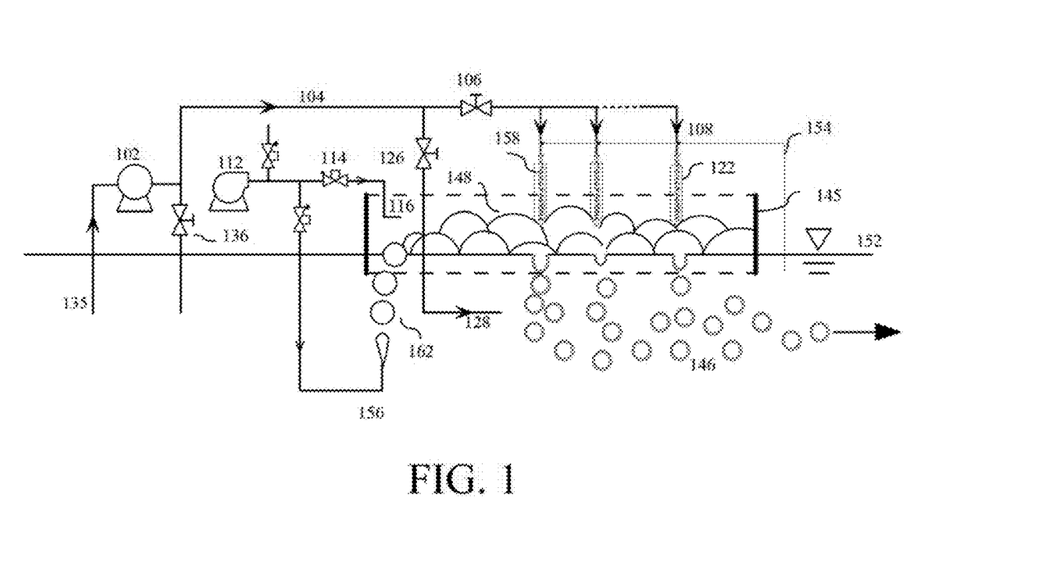
FIG. 1 shows a foam-type antibubble generating device according to a first embodiment of the present invention.

FIG. 1 shows a foam-type antibubble generating device according to a first embodiment of the present invention. The foam-type antibubble generating device can be simply divided into a jet flow or droplet generating system, for generating a jet flow or droplets in a discrete phase from a first fluid in a gas phase; a container, for accommodating a second fluid in a continuous phase; and a liquid membrane generating device, for forming a liquid membrane above the second fluid; where under the action of an external force, the jet flow or droplets pass through the liquid membrane and move towards the second fluid, so as to form antibubbles.

As shown in FIG. 1, the jet flow or droplet generating system may include at least one nozzle 108, for forming several jet flows of the first fluid in the gas phase. The system may use a water pump 102 to pump the first fluid from an inlet pipe 135, provides the first fluid for the nozzle 108 via a pipe 104, and further uses a valve 106 to adjust fluid velocity and/or fluid volume. The system may also include at least one jet nozzle 128, for generating a boost flow for driving antibubbles to move in the second fluid in a fluid phase accommodated in a container (not shown), where the volume and/or flow rate of the fluid ejected by the jet nozzle 128 may be adjusted by a valve 126. The first fluid and the second fluid may be the same or different. The first fluid and/or the second fluid may be an inorganic solution (such as, water, liquid ammonia, and liquid/carbon dioxide), and may also be an organic solution (such as styrene, perchlorethylene and trichlorethylene); may be a solution, and may also be an emulsion or suspension; may be added with various solutes (such as salts), a dye, a fluorescent substance, catalysts or reactants, particles, magnetic materials or magnetizable materials, and the like. The description about the first fluid and the second fluid is not limited thereto.

The liquid membrane generating device may be at least one jet nozzle 156, for transporting a first gas in the gas phase to the second fluid in the fluid phase, so as to form bubbles 162 in the second fluid in a liquid phase. The bubbles 162 rise to form foam on a liquid surface, thereby forming a foam layer 148 floating on a gas-liquid interface between a second gas and the second fluid. In the second gas in the gas phase, the foam can be evenly dispersed on the gas-liquid interface 152 by means of wind. A bubble collection frame 145 may be used, to restrain the bubbles in the bubble collection frame 145, where the bubble collection frame 145 may have no upper cover and bottom and merely have peripheral walls for restraining the foam in a particular area, so that the foam will not freely float over the entire liquid surface. The liquid membrane generating device may include a gas source 112, for transporting the first gas to the nozzle 156 via a pipe. The first gas and the second gas may be the same or different. Preferably, the first gas and the second gas may be air, and may also be selected to be other gases (such as argon, nitrogen and sulfur hexafluoride) according to standards such as inertia, density and solubility. The bubbles may be, for example, soap bubbles. The gas system may further include a nozzle 116, for making the foam evenly dispersed on the gas-liquid interface 152 by means of wind in the gas phase under the control of a valve 114.

Certainly, in addition to the airflow method, the foam layer may also be generated by an agitation method or a dissolved gas method. According to the agitation method, the liquid surface is made unstable through agitation or vibration, and entrains the gas, which goes into the fluid to form bubbles, so as to form foam; according to the dissolved gas method, through pressure reduction, the gas dissolved in the fluid is precipitated to form bubbles, so as to form foam.

In operation, a jet flow 158 formed by the nozzle 108 falls down. In the process of falling of the jet flow, due to Rayleigh-Plateau instability, the jet flow is scattered into a string of small droplets. The process that the jet flow is scattered into small droplets may occur before contact with the bubbles, or after the jet flow enters a bubble interface or intersection axis, or even after the jet flow enters the liquid surface of the second fluid. Certainly, in addition to scattering into the droplets by the jet flow, single or multiple droplets may also be generated by using a drip method, a condensation method or a vibration method. In the drip method, the droplets break off and fall apart from a drip nozzle by means of gravity or the surface tension. In the condensation method, water vapor is cavitation-saturated in a confined space and then condensed into water on the top of a closed container, and the water drop is increased until falling apart to form droplets (the principle of falling apart is the same as that of the drip method). In the vibration method, the liquid surface is made unstable through vibration to form droplets.

The jet flow or droplets may fall in the intersection area of the bubbles. The intersection area is generally near an intersection surface of two bubbles or an intersection axis of multiple bubbles. The droplets do not necessarily fall on an intersection line or intersection point, according to the specific falling speed of the droplets, the diameter of the droplets, the size of the soap bubbles and the thickness of the bubble liquid membrane, the point of fall may deviate a distance of one or multiple times of the diameter of the droplet from the intersection line or intersection point. It should be noted that, the fall of the droplets may rely on the gravity, and may also rely on other inertia forces such as a centrifugal force, and may also rely on an electromagnetic force, and so on. Definitely, the direction of the droplets is not limited to a downward direction, and may also be other directions.

If the jet flow is scattered into the droplet before contacting the bubble liquid membrane, due to the action of a surfactant, a gas layer is formed between the droplet and the bubble liquid membrane. With the falling of the droplet and the deformation of the bubble liquid membrane, the bubble liquid membrane between the bubbles gradually wraps the droplet, and a gas membrane is formed between the outer side of the droplet and the inner side of the liquid membrane. The droplet wrapped by the gas membrane continuously falls down on a bubble-liquid membrane surface or an intersection axis of multiple bubbles, contacts the liquid surface and goes into the fluid, and then gets away from the liquid membrane, to form an antibubble 146.

If the jet flow is scattered into droplets after entering the interface or intersection axis of the bubbles, the bubble liquid membrane between the bubbles gradually wraps the droplets, and a gas membrane is formed between the outer side of the droplet and the inner side of the liquid membrane. The droplet wrapped by the gas membrane continuously falls down on a bubble-liquid membrane surface or an intersection axis of multiple bubbles, contacts the liquid surface and goes into the fluid, and then gets away from the liquid membrane, to form an antibubble 146.

If the jet flow is scattered into droplets after entering the liquid surface of the second fluid, a gas membrane is formed between the droplet and the second fluid, and the gas membrane will completely wrap the droplet with the formation of the droplets, to form an antibubble 146.

On the outer side of the jet flow, a positioning tube 122 may be preferably disposed. The position of the positioning tube 122 adsorbs the bubbles and becomes the intersection area of the bubbles, so that the jet flow falls in the intersection area of the bubbles. When a bubble adsorbed near the positioning tube breaks off, other bubbles around the bubble will automatically and quickly fill its position, so that the position of the positioning tube is maintained to be the intersection area of the bubbles. Certainly, the positioning tube may not be added, and the jet flow or droplets directly penetrate through the soap bubbles, and then enter the water to form antibubbles; or the droplets or jet flow is blocked by the soap bubbles and is spattered and scattered into droplets, and then enters the liquid membrane between the bubbles, so as to form antibubbles.

The antibubble group is pushed by the boost flow generated by the nozzle 128 and leaves the antibubble generation area for other uses.

Figure 2:
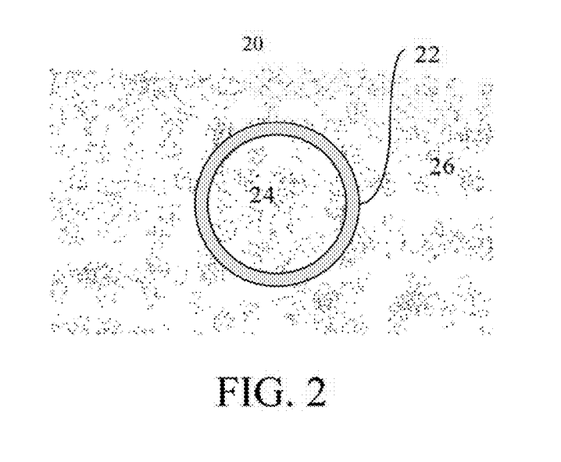
FIG. 2 is a schematic diagram of antibubbles.

FIG. 2 is a schematic diagram of antibubbles. An internal fluid of antibubbles 20 is a first fluid 24, a gas membrane 22 wraps the first fluid 24, and outside the gas membrane 22 is a second fluid 26 located outside the antibubbles.

Figure 3:
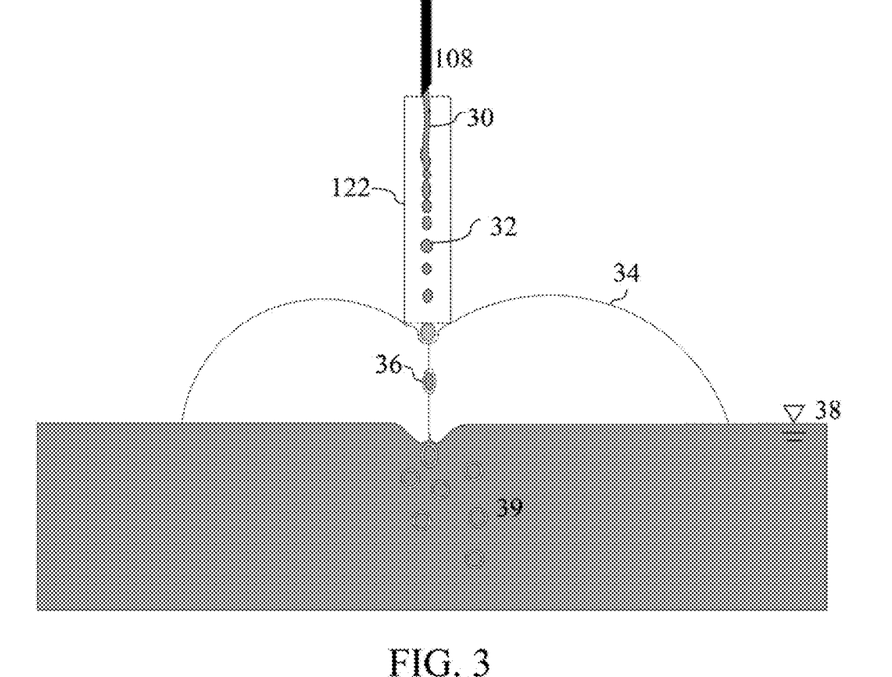
FIG. 3 is a schematic diagram showing the mechanism of formation of antibubbles by a jet flow entering water.

FIG. 3 is a schematic diagram showing the mechanism of formation of antibubbles by a jet flow entering water. As shown in FIG. 3, a positioning tube 122 is disposed on the outer side of the jet flow 30, and the position of the positioning tube 122 adsorbs the bubbles and becomes the intersection area of the bubbles (referring to the reference sign 36, which is the intersection interface or intersection line of the soap bubbles), so that the jet flow 30 falls in the intersection area 36 of the bubbles. The fluid jet flow ejected from the nozzle 108 first passes through the positioning tube 122, then passes through the intersection area 36 of the bubbles of the foam layer, and finally passes through a liquid surface 38 and enters the fluid phase to form the antibubble group 39.

Certainly, as shown in FIG. 1, a wire 154 is connected between the first fluid before the outlet of the nozzle 108 and the second fluid generating the antibubbles, so as to reduce the potential difference and improve the survival rate of the antibubbles.

Figure 11:
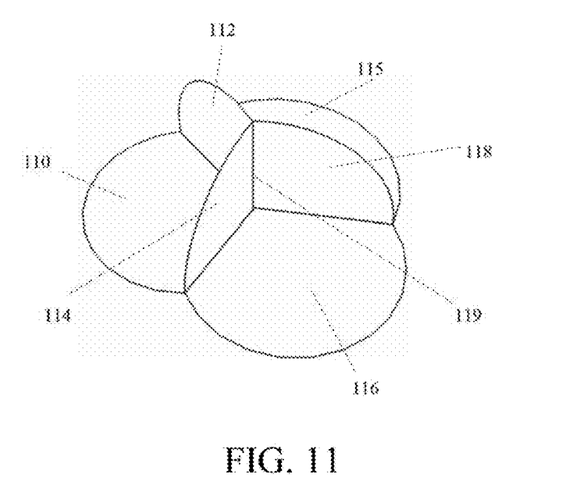
FIG. 11 illustrates a basic structure of a foam layer.

FIG. 11 illustrates a basic structure of a foam layer. In this structure, there are generally three bubbles, that is, a bubble 1, a bubble 2 and a bubble 3, which are adjacent to each other. The bubbles 1, 2 and 3 and the fluid respectively have intersection surfaces 110, 115 and 116 therebetween, and the bubbles 1, 2 and 3 have interfaces 112, 114 and 118 therebetween and have a common intersection axis 119. There is a great probability that the droplets penetrate through the intersection surface between the bubbles to form the antibubbles, especially penetrate through the common intersection surface of the three bubbles.

The present invention can generate a large number of antibubbles in a simple and convenient way, and can meet the needs of large-scale industrial applications.

Figure 4:
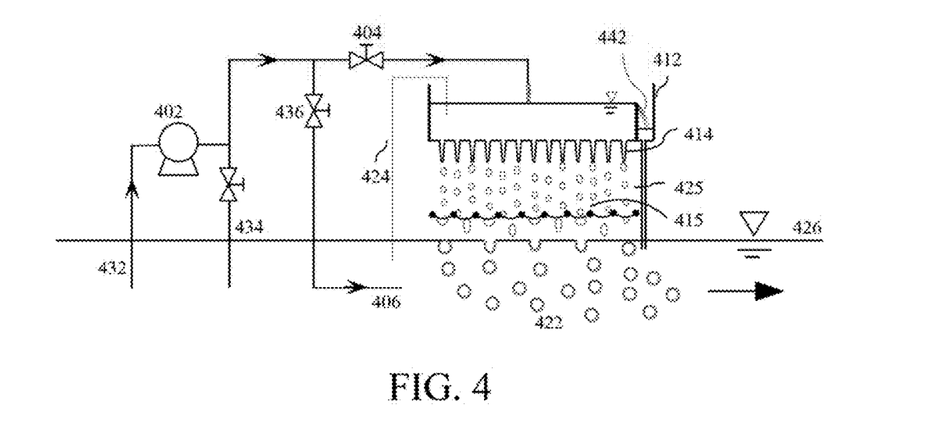
FIG. 4 is a schematic diagram of a liquid membrane-type antibubble generating device according to a second embodiment of the present invention.

FIG. 4 is a schematic diagram of a liquid membrane-type antibubble generating device according to a second embodiment of the present invention. The liquid membrane-type antibubble generating device is similarly divided into a droplet generating system, for generating droplets in a discrete phase from a first fluid through a gas phase; a container, for containing a second fluid in a continuous phase; and a liquid membrane generating device, for forming a liquid membrane on the second fluid; where, under the action of an external force, the jet flow or droplets pass through the liquid membrane and move towards the second fluid, to form antibubbles.

As shown in FIG. 4, the droplet generating system may include a fluid tank 412 and a drip nozzle 414 at the bottom or a lower position of the fluid tank 412. A certain amount of a first fluid is injected into the fluid tank 412. Under the determined pressure of the fluid tank 412, droplets of a specific size are formed at a specific rate by the drip nozzle 414. In addition to the droplets generated by the drip nozzle, the droplets may also be a string of droplets formed through scattering due to Rayleigh-Plateau instability or single or multiple droplets generated by a condenser or vibrator during the falling of the jet flow. In the condenser, water vapor is cavitation-saturated in a confined space and then condensed into water on the top of a closed container, and the water drop is increased until falling apart to form droplets. If a vibrator is used, the liquid surface is made unstable through vibration to form droplets.

Preferably, a weeping pipe is disposed below the fluid tank, and the height of a weir wall is adjusted to adjust the liquid level, so as to ensure the hydraulic pressure of the weeping pipe, thereby generating droplets of a certain size at a certain output frequency. The droplet generating system may include an intake pipe 432, the fluid is injected into the tank 412 via a liquid pump 402 and a pipe, and the injection rate and the total amount of the fluid may be controlled by using a valve 404. If an excessive amount of fluid is injected into the fluid tank 412, the fluid can be discharged via an overflow pipe 442.

The droplet generating system may further include a valve 436 and at least one nozzle 406, for pumping the fluid into a container (with no reference sign) of a second fluid (to be mentioned below) to generate a boost flow for driving the antibubbles to move. In the situation that the first fluid is different from the second fluid, it is selectable to pump the second fluid into the container of the second fluid via the nozzle 406.

Figure 6:
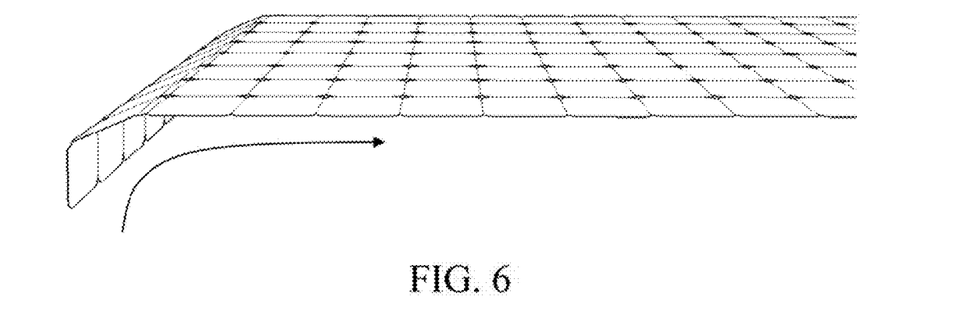
FIG. 6 is a schematic diagram of a liquid membrane frame.

The liquid membrane generating device may be realized by using a liquid membrane frame. Half of the liquid membrane frame may be immersed in the liquid phase, and half may be in the gas phase, thereby generating a liquid membrane 415. The liquid membrane frame may be driven by using a chain system (not shown) to continuously generate the liquid membrane 415. The gas phase may be air, and may also be selected to be other gases (such as argon, nitrogen and sulfur hexafluoride) according to standards such as inertia, density and solubility. FIG. 6 is a schematic diagram of a liquid membrane frame. In FIG. 6, the schematic frame is formed by square cells, and certainly, cells of other shapes, for example, round cells, may also be used. Certainly, the liquid membrane may also be generated in other ways.

Figure 5:
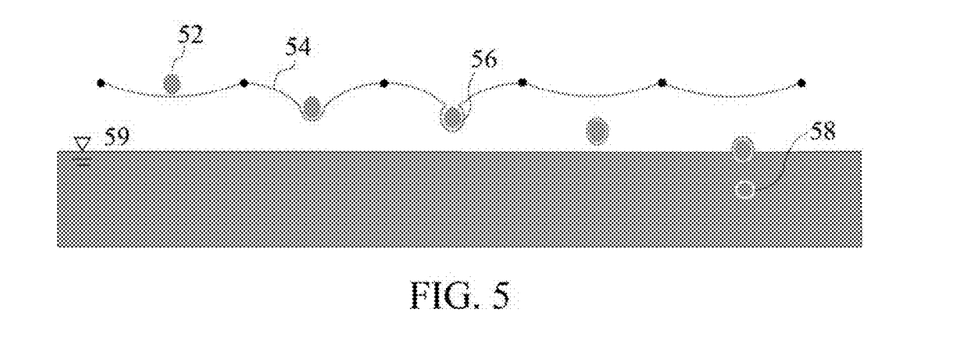
FIG. 5 is a schematic diagram showing the mechanism of formation of antibubbles by a jet flow entering water in the liquid membrane-type antibubble generating device.

In the operation (referring to FIG. 5, FIG. 5 is a schematic diagram showing the mechanism of formation of antibubbles by a jet flow entering water in a liquid membrane-type antibubble generating device), a droplet 425 (52) falls on the liquid membrane under the action of gravity or other forces (for example, a centrifugal force, a magnetic force and the like), and certainly, the falling direction is not limited to a downward direction, and may also be other directions. When the droplet 52 contacts the liquid membrane, due to the action of the surfactant, a gas layer (54) is formed between the droplet and the bubble liquid membrane. With the falling of the droplet and the deformation of the liquid membrane, the liquid membrane gradually wraps the droplet, and a gas membrane 56 is formed between the outer side of the droplet and the inner side of the liquid membrane. Then, the gas membrane is closed, and the droplet gets away from the liquid membrane, to form a double-membrane droplet wrapped by the gas membrane and the liquid membrane. After the droplet contacts the water surface, the liquid membrane on the outer layer is combined with the liquid surface, and the droplet wrapped by the gas membrane sinks into the liquid phase to form an antibubble 58. The antibubble is pushed by the boost flow and leaves the antibubble generation area for other uses.

Referring to FIG. 4 again, preferably, a wire 424 may be connected between the fluid before the outlet of the weeping pipe and the fluid generating the antibubbles, so as to reduce the potential difference and improve the survival rate of the antibubbles.

The antibubbles may be generated by relying on the gravity, and in occasions such as a space station having no gravity or weak gravity, the antibubbles may also be generated by relying on a centrifugal force, other inertia forces or an electromagnetic force.

Figure 7:
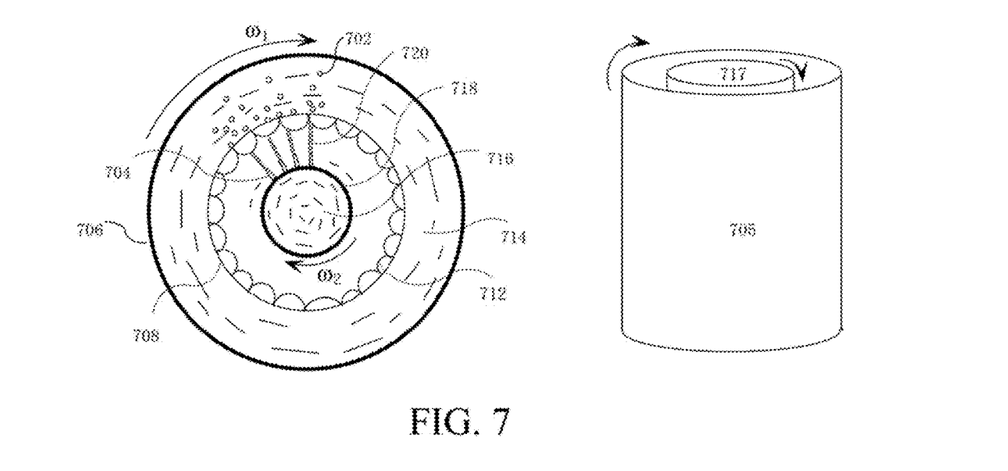
FIG. 7 is a schematic diagram of an antibubble generating device according to a third embodiment of the present invention.

FIG. 7 is a schematic diagram of an antibubble generating device according to a third embodiment of the present invention. As shown in FIG. 7, an outer rotor 705 is used as a container, which internally accommodates a fluid 702 in a continuous phase, and under the action of the centrifugal force, forms a cylindrical liquid surface 708 inside a barrel. A bubble generator (not shown) generates bubbles 712, and the bubbles float on the cylindrical liquid surface to form a liquid membrane. The jet flow or droplet generating system includes an inner rotor 717 and a nozzle 704. The inner rotor 717 internally accommodates a fluid 716 in a discrete phase. Under the action of the centrifugal force, the fluid in the discrete phase flows out from the nozzle 704 to form a jet flow 720, and the jet flow 720 shoots to the bubbles in a radial form, and goes into the fluid 702 in the continuous phase by means of the liquid membrane to form antibubbles 706. When rotation speeds of the outer rotor 705 and the inner rotor 717 are the same, the jet flow is vertically shoot into the soap bubbles; and when the rotation speeds are different, the jet flow is slantwise shoot into the bubbles, and a suitable angle is selected to achieve the best bubble generation effect. Certainly, a single liquid membrane may also be used to replace the foam layer.

Figure 8:
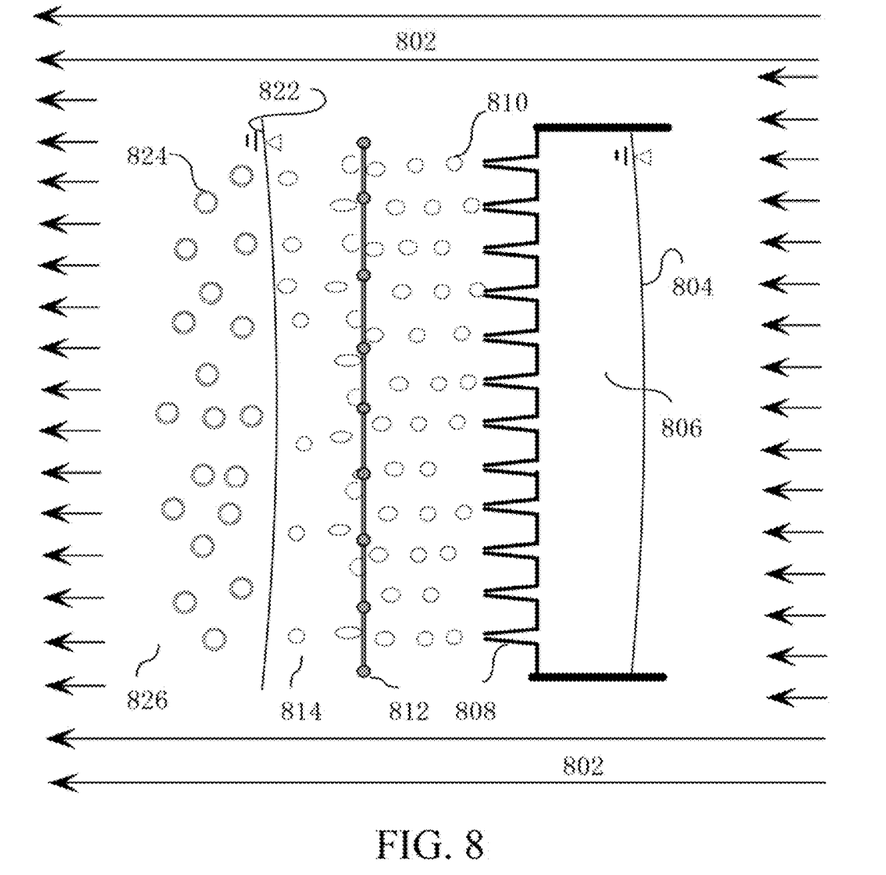
FIG. 8 is a schematic diagram of a liquid membrane-type antibubble generating device according to a fourth embodiment of the present invention.
Figure 9A:
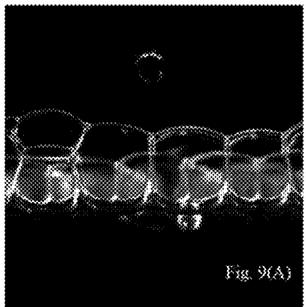
Figure 9B:
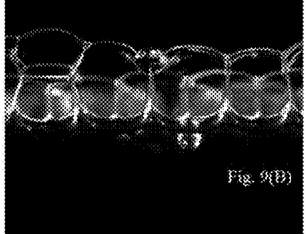
Figure 9C:
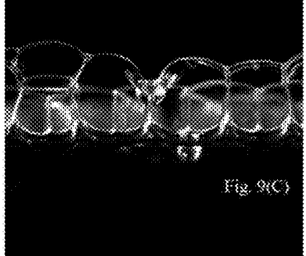
Figure 9D:
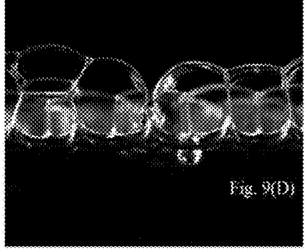
Figure 9E:
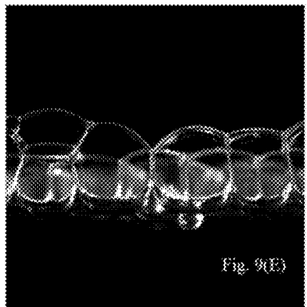
Figure 9F:
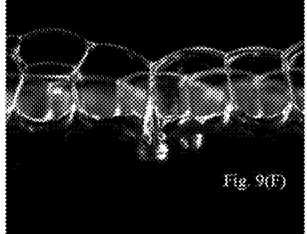
Figure 9G:
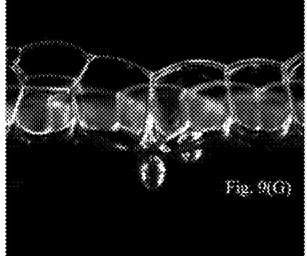
Figure 9H:
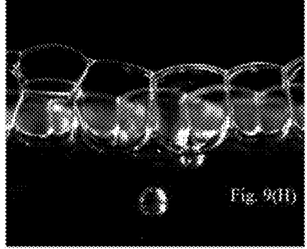
Figure 10:
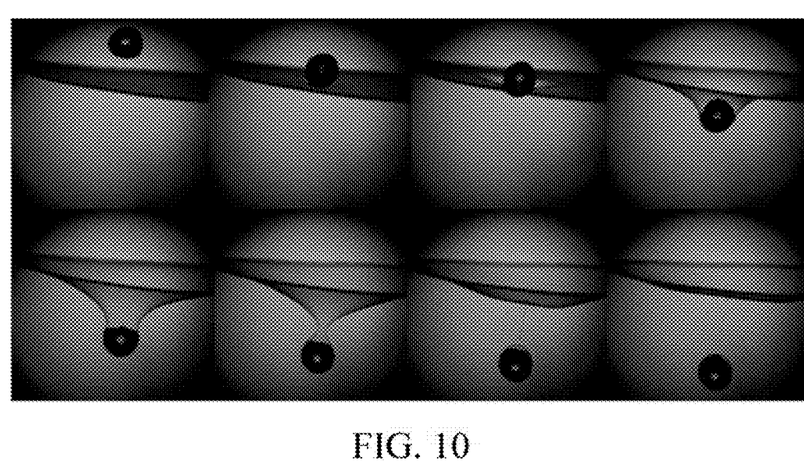

The antibubbles may also be generated by using a magnetic force. FIG. 8 is a schematic diagram of a liquid membrane-type antibubble generating device according to a fourth embodiment of the present invention. As shown in FIG. 8, magnetic particles are added to a fluid 806 in the discrete phase (interface 804), and under the action of an external magnetic field 802, a droplet 810 passes through a liquid membrane 812, and then (the droplet 814) moves towards a fluid 826 in the continuous phase to form a magnetic antibubble 824. Certainly, other forces or a composite of many forces may also be used to generate the antibubbles.

FIG. 9(a) to FIG. 9(h) and FIG. 10 respectively illustrate snapshots of a formation process of antibubbles.

The present invention achieves generation of a large number of antibubbles in a simple and convenient way, and can meet the needs of large-scale industrial applications.

Figure 12:
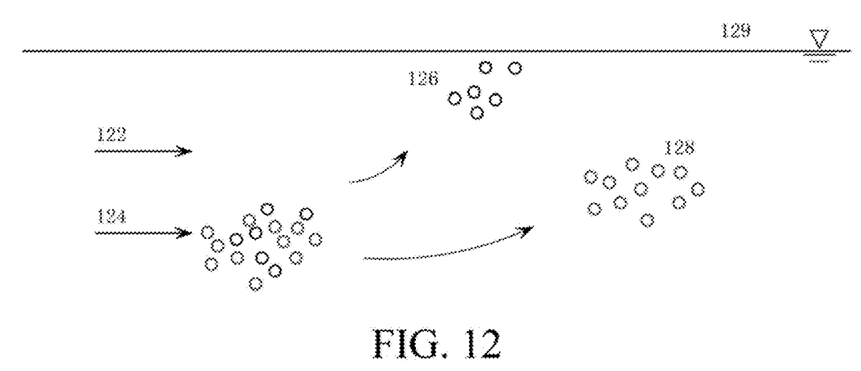
FIG. 12 illustrates an example of separation of bubbles and antibubbles.

FIG. 12 illustrates an example of separation of bubbles and antibubbles. If a phenomenon that bubbles and antibubbles are mixed occurs, the bubbles and the antibubbles can be separated by means of a buoyancy difference. The antibubbles merely contain a gas in the gas membrane, the gas membrane is very thin and is very small, the buoyancy is very small, so the floating rate of the antibubbles is very low. In FIG. 12, under the parallel boost of a high-speed fluid 124 and a low-speed fluid 122, lighter bubbles 126 and heavier antibubbles 128 are separated.

The objectives, technical solutions, and beneficial effects of the present invention have been described in further detail through the above specific embodiments. It should be understood that, the above description is merely specific embodiments of the present invention, but not intended to limit the protection scope of the present invention. Any modification, equivalent replacement and improvement made within the spirit and principle of the present invention shall fall within the protection scope of the present invention.

What is claimed is:

1. An antibubble preparation method, comprising:
generating a jet flow or droplets in a discrete phase from a first fluid through a gas phase of a gas; and
under action of an external force, passing the jet flow or droplets through a liquid membrane and into a second fluid in a continuous phase, to form antibubbles, wherein the liquid membrane comprises bubbles or foam floating on or above a liquid-gas interface between the gas phase of the gas and the second fluid.

2. The method according to claim 1, wherein the external force is one of an inertia force and an electromagnetic force, or a composite thereof.

3. The method according to claim 1, wherein the liquid membrane is a liquid membrane of a foam layer.

4. The method according to claim 3, wherein the foam layer is generated by an airflow, agitation, or a dissolved gas.

5. The method according to claim 1, wherein the droplets are formed through scattering using a Rayleigh-Plateau instability created by a jet flow.

6. The method according to claim 1, wherein the droplets are generated using drips, condensation, or vibration.

7. An antibubble generator, comprising:
a jet flow or droplet generating system, for generating a jet flow or droplets in a discrete phase from a first fluid through a gas phase;
a container for containing a second fluid in a continuous phase; and
a liquid membrane generating device, for forming a liquid membrane on the second fluid;
wherein, the antibubble generator is configured such that, under the action of an external force, the jet flow or droplets pass through the liquid membrane and move into second fluid to form antibubbles.

8. The antibubble generator according to claim 7, wherein the jet flow or droplet generating system comprises a first nozzle for forming a fluid jet flow in the gas phase so as to generate the droplets.

9. The antibubble generator according to claim 7, wherein the jet flow or droplet generating system comprises a drip nozzle, a condenser, or a vibrator, for generating the droplets.

10. The antibubble generator according to claim 7, wherein the liquid membrane is a liquid membrane of a foam layer.

11. The antibubble generator according to claim 10, comprising a second nozzle for forming bubbles in the second fluid so as to form a foam layer floating on a gas-liquid interface.

12. The antibubble generator according to claim 10, wherein the jet flow or droplet generating system comprises a positioning tube, the positioning tube pointing to an intersection area between bubbles of the foam layer;
wherein the fluid jet flow passes through the positioning tube, and then passes through the intersection area between bubbles of the foam layer.

13. The antibubble generator according to claim 7, wherein the liquid membrane generating device comprises a liquid membrane frame, one part of the liquid membrane frame being immersed in the second fluid, and one part being in the gas phase.

14. The antibubble generator according to claim 7, wherein the external force is a force of gravity.

15. The antibubble generator according to claim 7, wherein:
the droplet generating system comprises an inner rotor, the inner rotor accommodating the first fluid in the discrete phase;
the liquid membrane generating device comprises an outer rotor, the outer rotor accommodating the second fluid in the continuous phase; and
the external force is a centrifugal force, the outer rotor forming a cylindrical liquid surface of the second fluid inside a barrel under the action of the centrifugal force.

16. The antibubble generator according to claim 15, wherein:
the liquid membrane generating device comprises a bubble generator, bubbles generated by the bubble generator floating on the cylindrical liquid surface to form the liquid membrane; and
under the action of the centrifugal force, the first fluid in the discrete phase flows out from the nozzle to form a jet flow, which shoots to the bubbles in a radial form and goes into the second fluid in the continuous phase by means of the liquid membrane to form antibubbles.

17. The antibubble generator according to claim 15, wherein rotation rates of the outer rotor and the inner rotor are different.

18. The antibubble generator according to claim 7, wherein the external force is a magnetic force, the droplet generating system adds magnetic particles to the first fluid in the discrete phase, and under the action of the external magnetic force, the droplets move towards the second fluid in the continuous phase, to form magnetic antibubbles.

19. The method according to claim 1, wherein the liquid membrane comprises bubbles.

* * * * *